United States Patent
Wang et al.

(10) Patent No.: US 11,144,030 B2
(45) Date of Patent: Oct. 12, 2021

(54) DISTRIBUTED AUTOMATION CONTROL

(71) Applicant: BEET, Inc., Plymouth, MI (US)

(72) Inventors: David Jingqiu Wang, Northville, MI (US); Aaron Gregory Romain, Dearborn, MI (US); Daniel Philip Romain, Northville, MI (US)

(73) Assignee: BEET, INC., Troy, MI (US)

( * ) Notice: Subject to any disclaimer, the term of this patent is extended or adjusted under 35 U.S.C. 154(b) by 0 days.

(21) Appl. No.: 16/957,876

(22) PCT Filed: Jan. 25, 2019

(86) PCT No.: PCT/US2019/015308
§ 371 (c)(1),
(2) Date: Jun. 25, 2020

(87) PCT Pub. No.: WO2019/148053
PCT Pub. Date: Aug. 1, 2019

(65) Prior Publication Data
US 2020/0341458 A1   Oct. 29, 2020

Related U.S. Application Data

(63) Continuation-in-part of application No. PCT/US2019/014930, filed on Jan. 24, 2019.
(Continued)

(51) Int. Cl.
*G05B 19/418* (2006.01)
*G05B 19/402* (2006.01)
(Continued)

(52) U.S. Cl.
CPC ....... *G05B 19/402* (2013.01); *G05B 19/4185* (2013.01); *G06Q 10/087* (2013.01);
(Continued)

(58) Field of Classification Search
CPC .............. G05B 19/402; G05B 19/4185; G05B 2219/31455; G05B 2219/34008;
(Continued)

(56) References Cited

U.S. PATENT DOCUMENTS 8,880,442 B2   11/2014 Wang
2012/0098653 A1   4/2012 Slack
(Continued)

FOREIGN PATENT DOCUMENTS

JP   2003167613 A   6/2003
JP   2012203770 A   10/2012
(Continued)

OTHER PUBLICATIONS

International Preliminary Report on Patentability for international application No. PCT/US2019/015308 issued under Chapter II of the Patent Cooperation Treaty, dated Jun. 15, 2020.
(Continued)

*Primary Examiner* — Kim T Nguyen
(74) *Attorney, Agent, or Firm* — Quinn IP Law

(57) ABSTRACT

A distributed automation control system includes a network for connecting members of the system to a central server for communication between the members and the central server. The members can include a device controlled by a microcontroller in communication with the network, a mobile object digitized to communicate with the central server via the network, and a facility component in communication with the central server. A member can be assigned to one or more groups of members for group learning and for generating a group heartbeat. Each member defines a safety volume which is monitored by the central server. When the safety volume of one member overlaps the safety volume of
(Continued)

another member, the central server initiates a responsive action which can include ceasing the operation of at least one of the members.

20 Claims, 4 Drawing Sheets

Related U.S. Application Data

(60) Provisional application No. 62/621,709, filed on Jan. 25, 2018, provisional application No. 62/621,623, filed on Jan. 25, 2018.

(51) Int. Cl.
| | | |
|---|---|---|
| *G06Q 10/08* | (2012.01) | |
| *G06Q 50/04* | (2012.01) | |
| *G06K 7/10* | (2006.01) | |
| *G06K 19/07* | (2006.01) | |

(52) U.S. Cl.
CPC ..... *G06Q 50/04* (2013.01); *G05B 2219/31266* (2013.01); *G05B 2219/31455* (2013.01); *G05B 2219/34008* (2013.01); *G06K 7/10297* (2013.01); *G06K 19/0723* (2013.01)

(58) Field of Classification Search
CPC ....... G05B 2219/31266; G06Q 10/087; G06Q 50/04; G06Q 10/063114; G06Q 10/103; G06Q 10/06398; G06K 7/10297; G06K 19/0723; Y02P 90/30; G08B 25/14
See application file for complete search history.

(56) References Cited

U.S. PATENT DOCUMENTS

| | | | |
|---|---|---|---|
| 2012/0188087 A1* | 7/2012 | Wang | ............ H04L 67/10 340/657 |
| 2014/0222522 A1* | 8/2014 | Chait | ........... G06Q 10/0637 705/7.36 |
| 2016/0021040 A1 | 1/2016 | Frei et al. | |
| 2016/0183351 A1 | 6/2016 | Snyder et al. | |

FOREIGN PATENT DOCUMENTS

| | | |
|---|---|---|
| KR | 101645139 B1 | 8/2016 |
| WO | 2004040388 A1 | 5/2004 |
| WO | 2015110324 A1 | 7/2015 |

OTHER PUBLICATIONS

International search report and written opinion for international application No. PCT/US2019/015308.

* cited by examiner

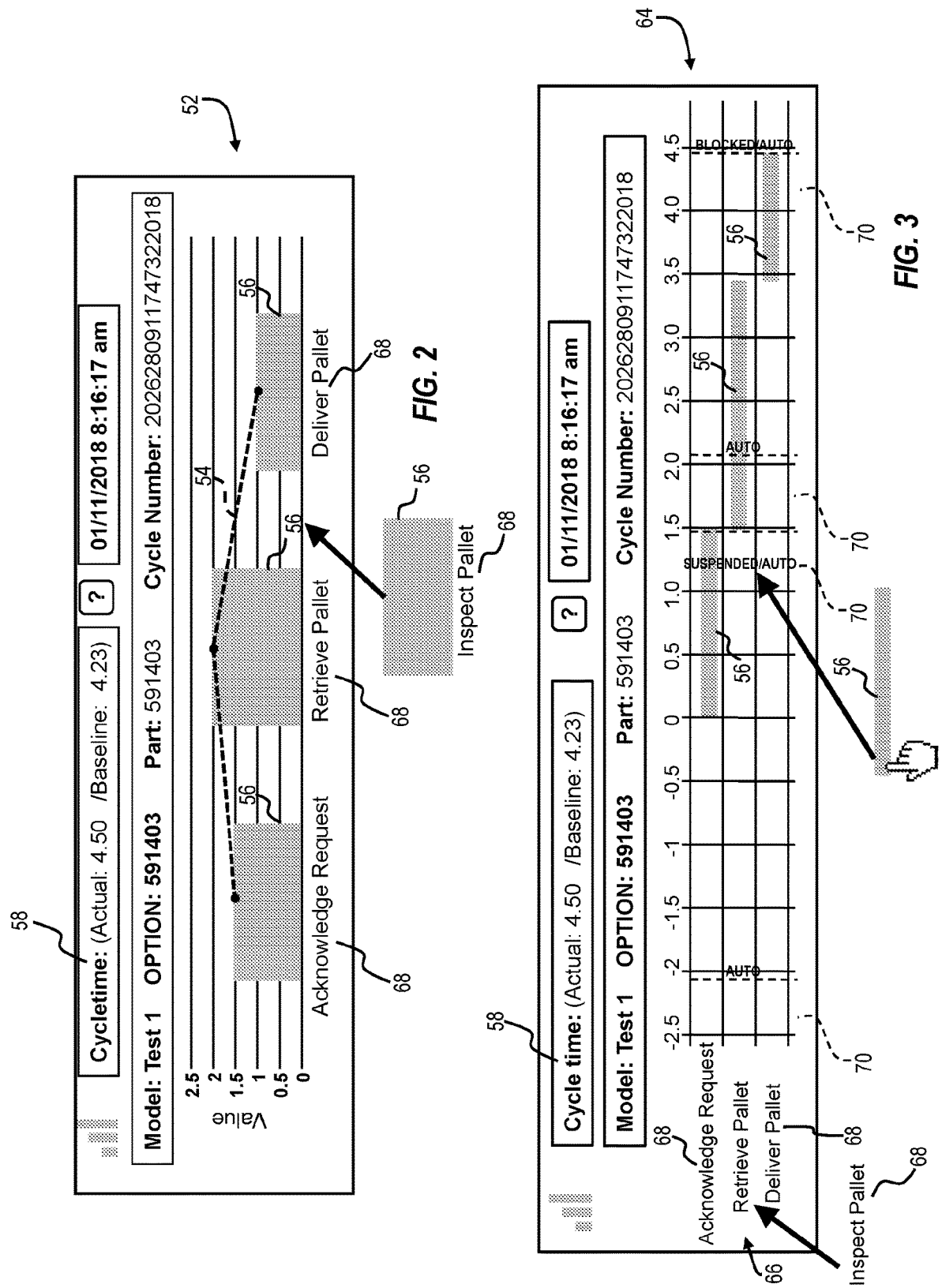

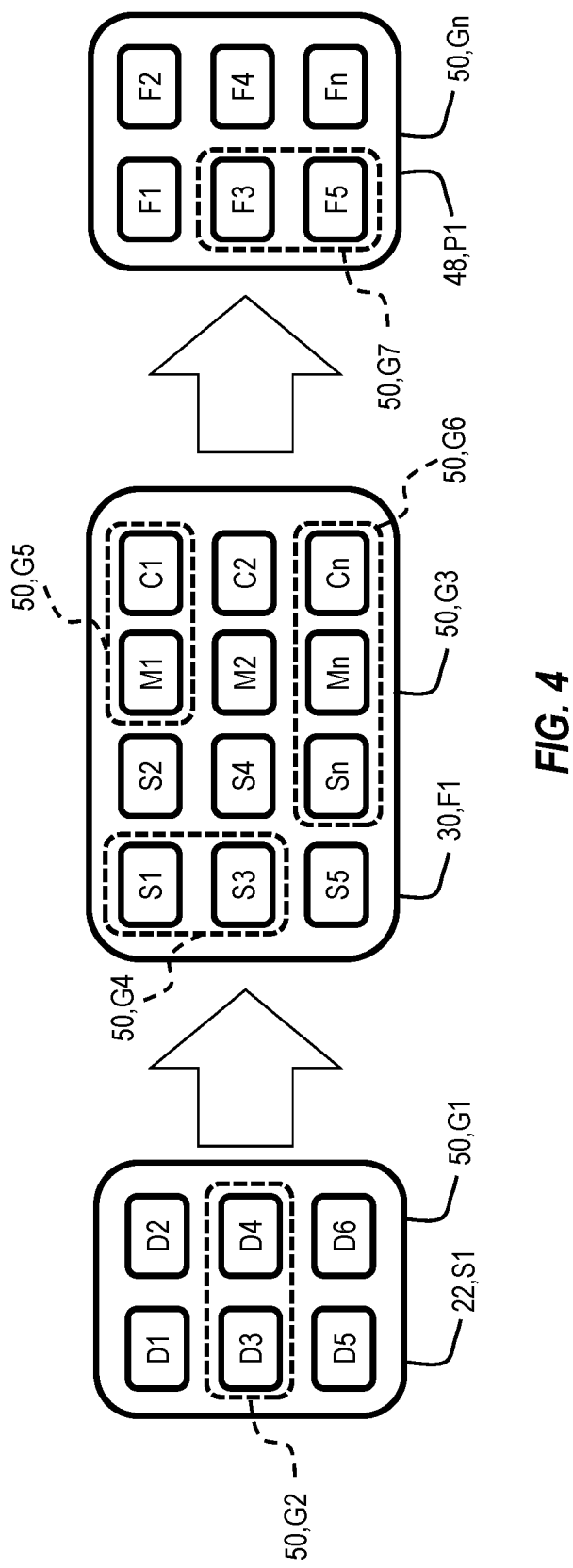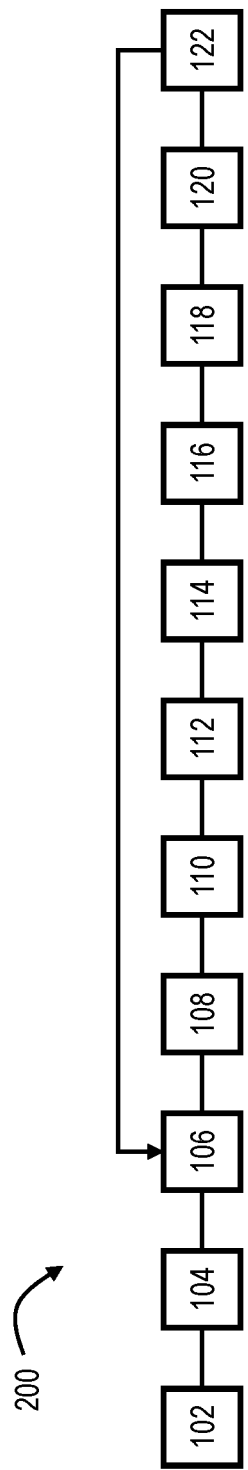

DISTRIBUTED AUTOMATION CONTROL

CROSS-REFERENCE TO RELATED APPLICATIONS

This Application claims the benefit of PCT Application PCT/US2019/014930 filed Jan. 24, 2019, U.S. Provisional Application 62/621,623 filed Jan. 25, 2018, and U.S. Provisional Application 62/621,709 filed Jan. 25, 2018, which are each hereby incorporated by reference in their entirety.

TECHNICAL FIELD

The present disclosure relates to a system and method for distributed automation control.

BACKGROUND

Many systems for performing a process include automated equipment for performing at least some of the tasks, operations and actions required to perform the process, some of which must be performed in a predetermined sequence. In some cases, a programmable learning controller (PLC) or similar device can be used to control the performance of the predetermined sequence. In some cases, other types of controllers and sensors can be used, where data generated by the PLCs and the other types of controllers and sensors may be collectively communicated through a network, however may not be readily combinable to analyze the entire process being performed. Further, each device, controller, sensor, transmitting data through the network may not have access, via the network, to the data or information transmitted from the other devices, controllers, sensors. Some tasks, operations and actions may be performed manually or by equipment which is not in communication with the controllers, such that these tasks, operations and actions and the people and/or equipment performing them are not digitized and therefore are not easily analyzed in the context of the process being performed. Likewise, facility components which supply a process and can affect the performance of a process, such as electrical power supply systems, hydraulic systems, pneumatic systems, environment control systems, etc. can produce data which may be readily combinable to analyze the entire process being performed. This segmentation of data and in some cases, the absence or minimal nature of the data, hampers and/or precludes communication of information between the various member performing the process, precludes and/or hampers comprehensive control of all elements of the process being performed, and limits the capability of a central server to analysis, monitor and/or take action to improve the effectiveness and/or efficiency of the process being performed.

SUMMARY

A method for distributed automation control, and a system for performing the method, is described herein. The method and system are advantaged by using system members which include microcontrollers powered and communicating via Power over Ethernet (PoE) and Ethernet over Power (EoP) networks, where each microcontroller is controlling, monitoring and reporting the performance of operations and tasks performed by its respective member, and the operating condition of the member, such that a programmable learning controller is no longer required to control the various member devices performing the sequence of operations. A central server in communication with the network can "see" when a new member is connected to the network, where the new member, via its microcontroller, can broadcast to the members connected to the network and to the central server the new member's member identification, functional capabilities, location, and operating condition. Addition of the new member occurs in a "plug and produce" environment provided, for example, through the PoE and EoP networks, EoP switch injectors, etc. Using process visualization displays, including heartbeat displays, members newly added to the network can be visualized to appear, when added to the network, on network and/or system displays, where a user can use "click-and-drag" mechanisms to synchronize the new member with an existing process step, or to add a new process step for the new member, without requiring, for example, reprogramming of a PLC.

Further, the method and system are advantaged by grouping the members into one or more member groups based on at least one of the member functions, the member location, and the member operating condition, etc. such that group learning by and between the group members and other groups is facilitate by real time communication between the group members of the groups and between the groups, enabled by the flexible communication structure provided by the PoE and EoP networks that can be utilized within the system. The groups can vary in membership from two to the full member population of a complex including multiple facilities, each facility employing a substantially large number of members, including multiple machines, stations, operations, devices, etc. In a non-limiting example the member group can include at least one member of the type which is not traditionally controlled by a PLC. For example, a member can be a facility component, such as a electrical power supply, a pneumatic supply, a hydraulic supply, an environment control system such as an HVAC system, etc., where oversight provided by a central server in communication the member devices allows for dynamic coordination of the tasks and processes performed by the members, for example, to balance consumption of shared facility components, such as electrical and/or pneumatic resources, to reduce peaks in consumption, and to reduce variability in the processes and products attributable to variability in these facility components, such as environment temperature and humidity levels by coordinating the operating conditions of these facility components with the scheduling and synchronization of the member devices performing, for example, production operations and tasks.

In a non-limiting example the member group can include one or more mobile objects performing actions required for the performance of processes in the facility, for example, equipment, tooling, and parts transportation within the facility, human actions including operator and material handling actions, and so forth, using mobile objects, including vehicles and humans, which function with variability and perform actions which may not be planned into a sequence of operations being performed by non-mobile members of the network. In one example, the system is configured to identify, track and monitor the actions of the mobile objects, for example, as disclosed in PCT Application PCT/US2019/014930 filed Jan. 24, 2019, to which the present application claims priority, and which is incorporated in its entirety herein by reference, by digitizing each mobile object and its actions, including its movements within a facility, such that the tracked and monitored actions of the mobile asset can be synchronized with the tracked and monitored actions of other mobile assets and other members operating within the facility to perform the processes performed therein. In one example, a safety volume is defined for each member in the network, including the mobile objects, and the movement and operating condition of each member is monitored for interactions between the safety volumes of the respective members, where an alert and/or action can be generated, for example, where an interaction between the safety volume of one member with the safety volume of another member is projected to occur or occurs. For example, by tracking the movement, location and safety zone of a human mobile object member such as a machine operator, a projected or predicted interaction of the safety volume of the human operator with, for example, the safety volume of a functioning robot, can cause the central server monitoring the movement of the safety volume of the machine operator and the safety volume of the robot, to generate an alert to one or both of the machine operator and the robot, such that preventive action can be taken, for example, alerting the operator to their location relative to the functioning robot and prompting the operator to change location away from the operating robot. Using the present example, should an interaction between the safety volume of the operator and the safety volume of the functioning robot occurs, for example, if the operator continues to move in location closer to the functioning robot such that the safety volume of the operator overlaps the safety volume of the robot, the central server monitoring the machine operator and the robot can take action, including, for example, ceasing operation of the robot until the operator's movements away from the robot cause the safety volumes of the operator and the robot to no longer overlap. As such, this monitoring, tracking, and response process for the interactions of safety volumes of the respective members including the mobile object members allow the facility to be operated without physical safety fences, guards and the like, reducing the delay in process time resulting from the incorporation of these physical barriers in the system, and increasing flexibility in equipment layout, floor space utilization, etc.

In an illustrative example, the system includes a network, at least a portion of which includes a power over ethernet (PoE) cable for connecting members of the system to the network The network can further include an ethernet over power (EoP) cable, for the transmission of power to the system. The system includes a central server in communication with the network, and a plurality of members connected to the central server via the network such that each member is in communication with the central server. In one example, connecting each member of the plurality of members to the central server includes connecting the member to the network, broadcasting to the central server, from the member via the network, a member identification (ID) of the member, a location of the member provided as a member location, a function performable by the member provided as a member function, and a current operating condition of the member. The central server includes a memory and a processor and is configured to store a plurality of operations to a database, and assign, via the network, at least one operation of the plurality of operations to the member, for performance by the member. In one example, at least one member of the plurality of members is a device including a microcontroller in communication with the central server via the PoE cable, where the microcontroller includes a processor and a memory configured to control the device to perform the at least one operation assigned to the device.

Each member is configured to monitor the current operating condition of the member, e.g., itself, and to compare its current operating condition to an acceptable condition defined for the current operating condition, such that the member is self-diagnosing its current operating condition.

Each member is configured to monitor a performance of each operation assigned to the member, to be performed by the member, and to compare the performance of the operation to an operation specification defined for the operation, such that the member is self-diagnosing its performance of the operation. Each member is configured to transmit an alert signal to the central server when at least one of the current operating condition of the member is not the acceptable condition, and the performance of the at least one operation is noncompliant with the operation specification, so that the central server, in response to the alert signal, can analyze the impact of the member's current operating condition and/or perform and initiate corrective and/or mitigating actions to minimize the impact on the quality, efficiency, and/or productivity of the process being performed including the operations performed by the member transmitting the alert.

The method can further include the central server assigning the member to a group such that the member is associated with the group as a group member, where the group is comprised of a plurality of group members including the member, and where the group is defined by at least one of the member ID, the member location, the member function, and the current operating condition of the member. The group members are in communication with each other and with the central server via the network, such that group learning can occur within the group through the exchange of data and information via the network. Group learning can occur, for example, by the central server generating a group heartbeat using timestamped data collected from the plurality of group members, where the group heartbeat can be used, for example, to determine the acceptable condition of the current operating condition for the group, and/or to establish a baseline heartbeat for the operating condition. The heartbeat can be generated and/or displayed as described in U.S. Pat. No. 8,880,442 B2 issued Nov. 4, 2014. In one example, the alert signal transmitted to the central server by the member is also broadcast to each other member of the groups which with the member is associated, such that each member of the group is made aware of the condition of the member.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 2 is a schematic illustration of an example heartbeat display generated for a sequence of operations performed by the system of FIG. 1;

FIG. 3 is schematic illustration of another example heartbeat display generated for a sequence of operations performed by the system of FIG. 1;

FIG. 4 is a schematic illustration of groups formed from members of the system of FIG. 1;

FIG. 5 is a schematic illustration of a method for distributed automation control, using the system of FIG. 1;

DETAILED DESCRIPTION

Figure 1:
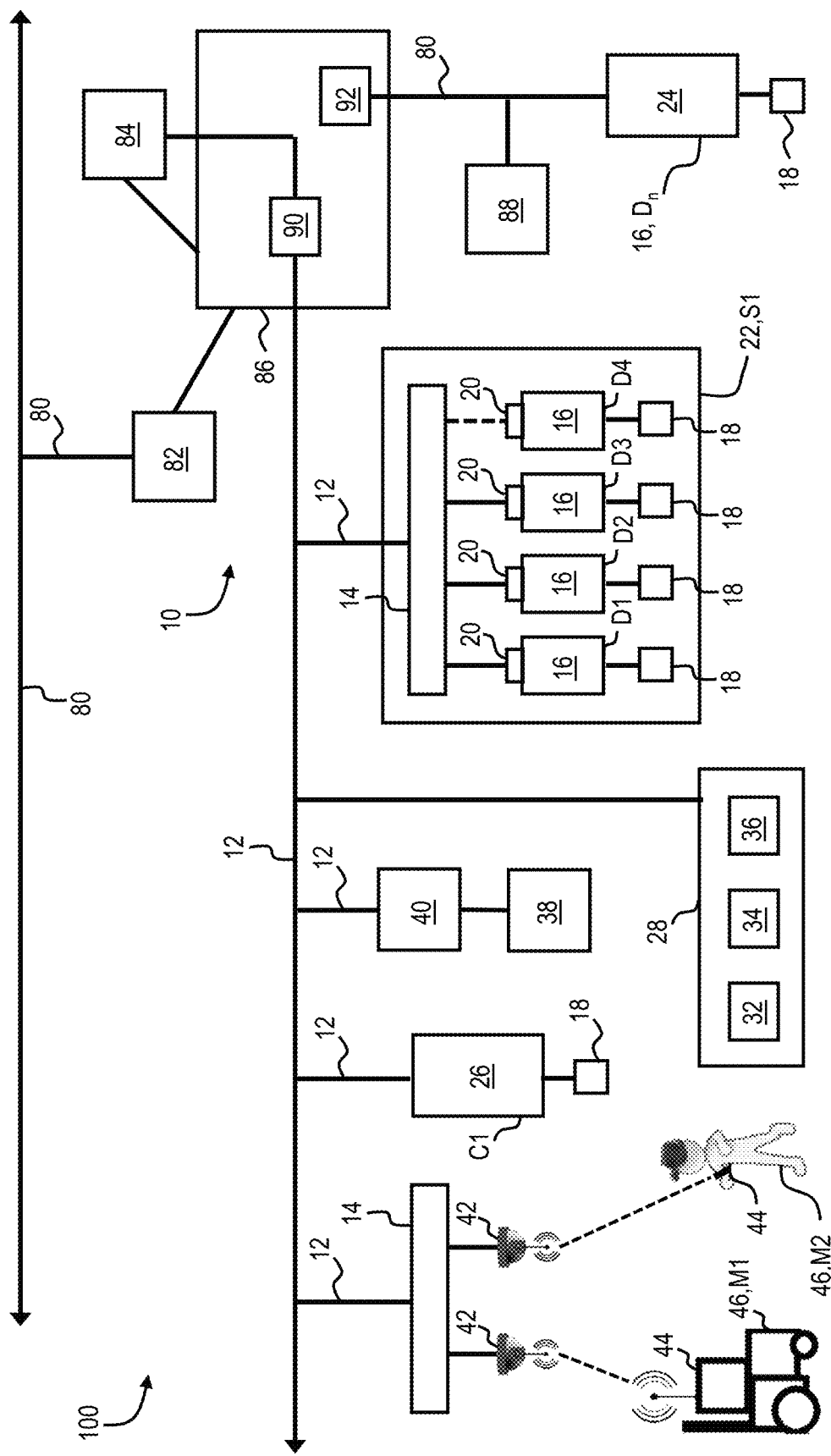
FIG. 1 is a schematic illustration of a system for distributed automation control, the system including a plurality of members in communication with a central server via a network, the plurality of members including at least one device controlled by a microcontroller in communication with the network.

The elements of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Referring to the drawings wherein like reference numbers represent like components throughout the several figures, the elements shown in FIGS. 1-8 are not necessarily to scale or proportion. Accordingly, the particular dimensions and applications provided in the drawings presented herein are not to be considered limiting.

Referring to FIGS. 1-8, a system 100 and a method 200, as described in additional detail herein, are provided for distributed automation control. A method 200 for distributed automation control, and a system 100 for performing the method, is described herein. The method 200 and system 100 are advantaged by using system members, including, for example, member devices 16, which can each include a microcontroller 20 powered and communicating via Power over Ethernet (PoE) and Ethernet over Power (EoP) cables 12, 80 comprising a network 10, where each microcontroller 20 is controlling, monitoring and reporting the performance of operations and tasks 68 performed by its respective member, and the operating condition of that member, such that a programmable learning controller is no longer required to control the various member devices 16 performing a sequence of operations 66 within the facility 30. Various types of members are used in the performance of a process within the facility 30, including for example, devices 16, including robots 24, mobile objects 46 including vehicles, carriers, and people, facility components 26 including electrical power distribution and supply, hydraulic and pneumatic systems, HVAC systems, warehousing and storage systems, structural components such as doors, conveyors, fans, etc.

A central server 28 in communication with the network 12, 80 can "see" when a new member is connected to the network 10, where the new member, via its microcontroller 20, can broadcast, to the members connected to the network 10 and to the central server 28, information about the new member including, for example, the member's member identification (ID), functional capabilities, location, and operating condition. The member identification (ID) can include, for example, an IP address of the member on the network 10, and/or a member ID stored to database in communication with the network 10, such as the database 36 of the server 28, where the member ID is associated in the database 36 with the member. The functional capabilities can include, for example, clamping, drilling, machining, assembling, fastening, welding, etc., where the member can broadcast the functions which can be performed by that member over the network 10 to the other members and to the central server 28. For example, the devices 16 can include clamps, pins, weld guns, nut runners, etc., which are arranged to perform operations assigned to each of the devices 16 by the central server 24. In the example shown in FIG. 1, the devices D1, D2, D3, D4 are grouped in a station 22, indicated at S1. One or more sensors 18 can be in communication with a member 16, 24, 26, 46 such that the sensor is configured to sense at least one of the operating condition of the member 16, 24, 26, 46 and the performance of the at least one operation assigned to the member 16, 24, 26, 46, and to output a sensor signal, via the sensor, to the member 16, 24, 26, 46, wherein the sensor signal is defined by the at least one of the operating condition of the member 16, 24, 26, 46 and the performance of the at least one operation assigned to the member 16, 24, 26, 46 sensed by the sensor. In another example, the central server 28 can maintain a listing of actions, tasks and operations which are performed within the facility 30, and the member can select from the listing at least one action, task or operation within the functional capabilities of the member, such that the member can be associated with their functional capabilities, including the tasks, actions and operations selected or broadcasted by the member, in the database 36. In one example, the listing maintained by the central server 28 includes the operations, tasks or actions listed in one or more sequences of operations, tasks or actions, where the functions listed in the sequence of operations are sequentially performed within the facility 30 by one or more of the members of the network 10.

Addition of the new member occurs in a "plug and produce" environment provided, for example, through the PoE and/or EoP network 10, EoP adapters 90, 92, EoP switches and switch injectors 14, etc. Using process visualization displays, including heartbeat displays 52, 64, members which are newly added to the network 10 can be visualized to appear, when added to the network 10, on network 10 and/or system displays 52, 64, where a user can use "click-and-drag" mechanisms to synchronize the new member with an existing process step, or to add a new process step for the new member, without requiring, for example, reprogramming of a PLC. FIGS. 2 and 3 illustrate an example of adding a new operation 68 "inspect pallet" to the sequence of operations 66, where the new operation 68 is inserted, via the sequence of operations display 66, to succeed the operation 68 "retrieve pallet" and to precede the operation 68 "deliver pallet" where the new operation 68 is performed by a new device D4 (see FIG. 1), which may be, for example, a test device for inspecting a parameter of the pallet, which is readily added to the system 100 by connecting (as indicated by the dashed line) the new device D4 to the network 10 via the PoE switch injector 14.

Further, the method and system are advantaged by grouping the members into one or more member groups 50 based on at least one of the member function, the member location, and the member operating condition, etc. such that group learning by and between the group members and other groups 50 is facilitate by real time communication between the group members of the groups 50 and between the groups 50, enabled by the flexible communication structure provided by the PoE and/or EoP network 10 that can be utilized within the system 100. The groups 50 can vary in membership from at least two members to the full member population of a complex 48 including multiple facilities 30, each facility 30 employing a substantially large number of members, including multiple machines, stations 22, operations, devices 16, etc. In a non-limiting example the member group 50 can include at least one member of the type which is not traditionally controlled by a PLC. For example, a member can be a facility component 26, such as a electrical power supply, a pneumatic supply, a hydraulic supply, an environment control system such as an HVAC system, etc., where oversight provided by a central server 28 in communication the members connected to the network 10 allows for dynamic coordination of the tasks and processes performed by the members, for example, to balance consumption of shared facility components 26, such as electrical and/or pneumatic resources, to reduce peaks in consumption, and to reduce variability in the processes and products attributable to variability in these facility components 26, such as environment temperature and humidity levels, by coordinating the operating conditions of these facility components 26 with the scheduling and synchronization of the members performing, for example, production operations and tasks.

Figure 6:
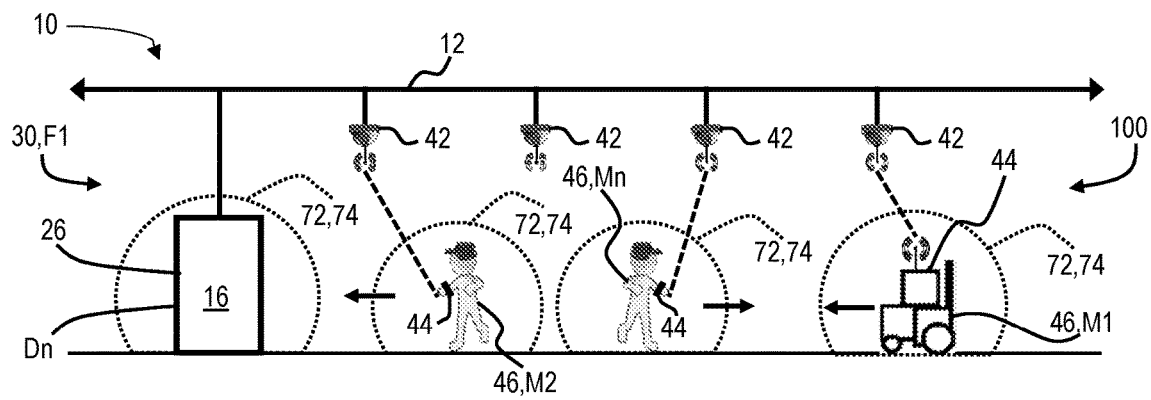
FIG. 6 is a schematic illustration of the system of FIG. 1, including a safety volume defined by each member, where in the example shown the safety volume of each member is in an acceptable state.
Figure 7:
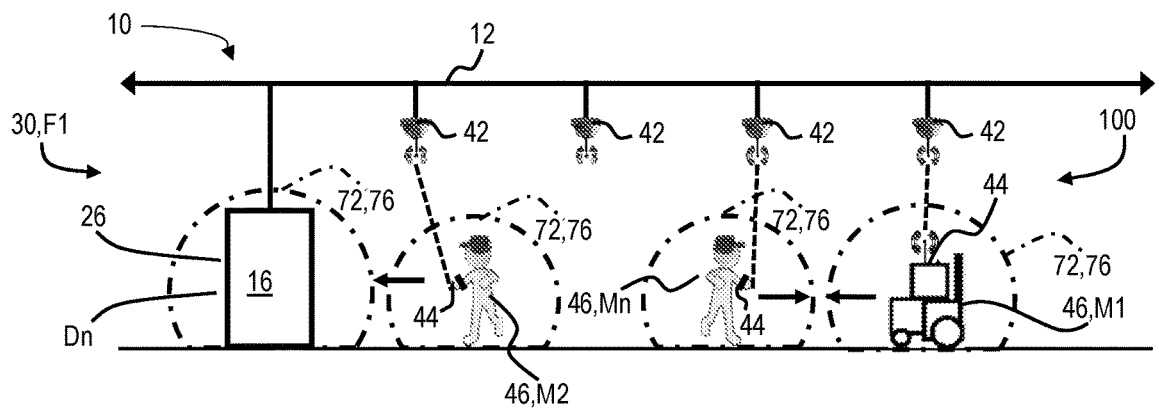
FIG. 7 is a schematic illustration of the system of FIG. 7, where in the example shown the safety volume of each member is in an alert state.
Figure 8:
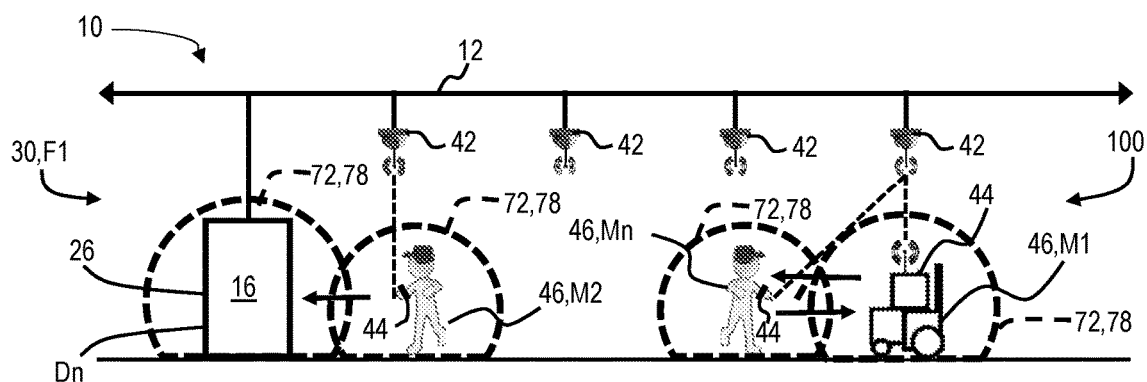
FIG. 8 is a schematic illustration of the system of FIG. 7, where in the example shown the safety volume of each member is in an action state.

In a non-limiting example the member group 50 can include one or more mobile objects 46 performing actions required for the performance of processes in the facility 30, for example, transporting equipment, tooling, parts carriers and parts within the facility 30, human actions including operator and material handling actions, and so forth, using mobile objects 46, including vehicles and humans, which function with variability and perform actions which may not be planned into a sequence of operations 66 being performed by non-mobile members of the network 10. In one example, the system 100 is configured to identify, track and monitor the actions of the mobile objects 46, for example, as disclosed in PCT Application PCT/US2019/014930 filed Jan. 24, 2019, to which the present application claims priority, and which is incorporated in its entirety herein by reference, by digitizing each mobile object 46 and its actions, including its movements within a facility 30, such that mobile object 46 is in communication with the network 10 and central server 28, and such that the tracked and monitored actions of the mobile asset 46 can be synchronized with the tracked and monitored actions of other mobile assets 46 and other members operating within the facility 30 to perform the processes performed therein. In one example shown in FIG. 6, a safety volume 72 is defined for each member in the network 10, including the mobile objects 46, and the movement and operating condition of each member is monitored for interactions between the safety volumes 72 of the respective members, where an alert and/or action can be generated, for example, where an interaction between the safety volume 72 of one member with the safety volume 72 of another member is projected to occur or occurs. As shown in FIG. 6, the safety volumes 72 of the members are sufficiently separated from each other such that the volume state of each safety volume 72 is an accepted state 74 (indicated in FIG. 6 by the dotted lines), and no alert or action is required at the time monitoring of the member locations shown in FIG. 6 occurred, e.g., at a monitoring time, where the central server 28 assess the member locations and state of each safety volume 72 in real time. For example, as shown in FIG. 7, by tracking the movement, location and safety zone 72 of a human mobile object 46 such as a machine operator, a projected or predicted interaction of the safety volume 72 of the human operator 46 with, for example, the safety volume 72 of a functioning robot 24, can cause the central server 28 monitoring the movement of the safety volume 72 of the human operator 46 and the safety volume 72 of the robot 24, to place the safety volumes 72 projected to interact into an alert state 76 (indicated in FIG. 7 by dash-dot-dash lines), and to generate an alert to one or both of the human operator 46 and the robot 24, such that preventive action can be taken, for example, alerting the operator 46 to the operator's location relative to the functioning robot 24 and prompting the operator 46 to change location away from the operating robot 24. Using the present example, should an interaction between the safety volume 72 of the operator 46 and the safety volume 72 of the functioning robot 24 occurs, for example, as shown in FIG. 8, if the operator 46 continues to move in location closer to the functioning robot 24 such that the safety volume 72 of the operator 46 overlaps the safety volume 72 of the robot 24, placing each of the overlapping safety volumes 72 in an action state 78 (indicated in FIG. 8 by dashed lines), the central server 28 monitoring the operator 46 and the robot 24 can take action, including, for example, ceasing operation of the robot 24 until the operator's movements away from the robot 24 cause the safety volumes 72 of the operator 46 and the robot 24 to no longer overlap. As such, this monitoring, tracking, and response process for the interactions of safety volumes 72 of the respective members including the mobile objects 46 allow the facility 30 to be operated without physical safety fences, safety guards and the like, reducing the delay in process time resulting from the incorporation of these physical barriers in the system 100, and increasing flexibility in equipment layout, floor space utilization, etc.

Referring to FIG. 1, the system includes a facility 30 including a network 10, at least a portion of which includes a powerline or power over ethernet (PoE) cable 12, and at least a portion of which includes an ethernet over power (EoP) cable 80, for the transmission of power to portions of the system 100 requiring greater power output. In the example shown in FIG. 1, the system 100 includes a transformer 82 for receiving the EoP power line 80 into a power distribution panel 86. The power line 80 into a power distribution panel 86. The incoming power can be, for example a higher voltage line 80 to power industrial equipment in the facility 30, such as an industrial robot 24 and variable frequency drive 88. The higher voltage line 80, for example, 480VAC, is connected to the robot 24, via a high voltage EOP adapter 92 such the robot 24 is powered via an EoP cable 80 exiting the power distribution panel 86 from the EoP adapter 92. The EoP power line 80 is transformed via a transformer 84 to a lower voltage, for example, 120 VAC, and exits the power distribution panel 86 via a low voltage EoP adapter 90 via an EoP cable 12, where the lower voltage is required for operation of microcontrollers 20 and/or other electronic components requiring the lower voltage, including, for example, the central server 28.

The central server 28 is connected to the network 10 via a EoP cable 12 and includes a CPU 32 for executing one or more algorithms for monitoring and analyzing the operating condition and performance of members 16, 24, 46 in communication with the central server 28 via the network 10, for compiling and storing a listing of operations, events, tasks performed by the members of the system 100, where the operations, events and tasks can be referred to individually or collectively as an operation or operations 68, for compiling the operations 68 into a sequence of operations 66, for determining an event duration 56 of an operation 68, for determine a cycle time 58 of a sequence of operations 66, for assigning a member to a group 50 and associating that member with the group 50 for storage in a database, such as database 36, for monitoring a safety volume 72 of a member to determine whether a volume state of the safety volume 72 is one of an acceptable state 74, an alert state 76, and an action state 78, to receive alerts from one or more members of the system 100, to generate actions in response to the alerts, to receive input from one or more identifiers 44 and from one or more object trackers 42 for use in identifying and digitizing the movements and actions of one or more mobile objects 46, for compiling and outputting visualization data including heartbeat displays 52 and sequence of event displays 54 to at least one of a user device 40 and/or a display outlet 38, and to perform other tasks and functions as described herein. The central server 28 include a memory 34, at least some of which is tangible and non-transitory, and may include, by way of example, ROM, RAM, EEPROM, etc., of a size and speed sufficient, for example, for executing the algorithms, storing data to a database 36, and/or communicating with one or more user devices 40, one or more display outputs 38, one or more sensors 18 connected to the device 16, the network 10, and with one or more members 16, 24, 26, 46 connected to the network 10.

The facility 30 includes a plurality of members for performing a process within the facility 30, where the members, in the example shown, can include a plurality of devices 16 connected to the network 10 via the EoP cable 12, also indicated in FIG. 1 as D1, D2, D3, D4 . . . Dn. In the example shown, each of the devices D1, D2, D3, D4 includes a microcontroller 20 for communicating with the central server 28 via the network 10, and performing other functions as described herein. The microcontroller 20 include a processor for executing one or more algorithms for monitoring and analyzing the operating condition and performance of the device 16, and a memory, at least some of which is tangible and non-transitory, and may include, by way of example, ROM, RAM, EEPROM, etc., of a size and speed sufficient, for example, for executing the algorithms, storing data to a database, and/or communicating with the central server 28, the device 16 controlled by the microcontroller 20, one or more sensors 18 connected to the device 16, the network 10, and with one or more members connected to the network 10.

In an illustrative example and referring to the method 200 shown in FIG. 5, the system 100 includes a network 10, at least a portion of which includes a power over ethernet (PoE) cable 12 for connecting members 16, 24, 26, 46 of the system 100 to the network 10 The network 10 can further include an ethernet over power (EoP) cable 12, for the transmission of power to the system 100. The system 100 includes a central server 28 in communication with the network 10, and a plurality of members connected to the central server 28 via the network 10 such that each member 16, 24, 26, 46 is in communication with the central server 28. In one example, connecting each member 16, 24, 26, 46 of the plurality of members to the central server 28 includes connecting (at 102 in FIG. 5) the member 16, 24, 26, 46 to the network 10, broadcasting (at 104 in FIG. 5) to the central server 28, from the member 16, 24, 26, 46 via the network 10, a member identification (ID) of the member 16, 24, 26, 46, a location of the member 16, 24, 26, 46 provided as a member location, a function performable by the member 16, 24, 26, 46 provided as a member 16, 24, 26, 46 function, and a current operating condition of the member 16, 24, 26, 46. The central server 28 includes a memory and a processor and is configured to store a plurality of operations to a database 36, and (at 102 in FIG. 5) assign, via the network 10, at least one operation of the plurality of operations to the member 16, 24, 26, 46, for performance by the member 16, 24, 26, 46. In one example, at least one member 16, 24, 26, 46 of the plurality of members is a device including a microcontroller in communication with the central server 28 via the PoE cable 12, where the microcontroller includes a processor and a memory configured to control the device to perform the at least one operation assigned to the device.

Each member 16, 24, 26, 46 is configured to monitor (at 106 in FIG. 5) the current operating condition of the member 16, 24, 26, 46, e.g., itself, and to compare its current operating condition to an acceptable condition defined for the current operating condition, such that the member 16, 24, 26, 46 is self-diagnosing its current operating condition. Each member 16, 24, 26, 46 is configured to monitor a performance of each operation assigned to the member 16, 24, 26, 46, to be performed by the member 16, 24, 26, 46, and to compare the performance of the operation to an operation specification defined for the operation, such that the member 16, 24, 26, 46 is self-diagnosing its performance of the operation. Each member 16, 24, 26, 46 is configured to transmit (at 108 in FIG. 5) an alert signal to the central server 28 when at least one of the current operating condition of the member 16, 24, 26, 46 is not the acceptable condition, and the performance of the at least one operation is noncompliant with the operation specification. The central server 28 receives the alert signal (at 110 in FIG. 5). The central server 28, in response to the alert signal, can analyze (at 112 in FIG. 5) the impact of the member's current operating condition and/or perform and initiate corrective and/or mitigating actions (at 114 in FIG. 5) to minimize the impact on the quality, efficiency, and/or productivity of the process being performed including the operations performed by the member 16, 24, 26, 46 transmitting the alert.

The method includes receiving (at 110 in FIG. 5) via the central server 28, the alert signal from the member 16, 24, 26, 46, and identifying (at 112 in FIG. 5), via the central server 28, an action in response to the alert signal. The central server 28 assigns (at 114 in FIG. 5) the action to at least one member 16, 24, 26, 46 of the plurality of members in the network 10, for performance of the action (at 120 in FIG. 5) by the at least one member 16, 24, 26, 46. At 116 in FIG. 5, the action is broadcast via the network 10 to the members 16, 24, 26, 46. In one example, the action includes at least one of ceasing performing of the operation by the member 16, 24, 26, 46, ceasing operation of the member 16, 24, 26, 46, e.g., shutting down the device, and reassigning the at least one operation to another member 16, 24, 26, 46 of the plurality of members, for performance of the at least one operation by another member 16, 24, 26, 46. In another example, the action taken by the central server 28 includes modifying a current operating condition of another member 16, 24, 26, 46, where modifying the current operating condition of the other member 16, 24, 26, 46 causes a change in the current operating condition of the member 16, 24, 26, 46. At 120 in FIG. 5, the members 16, 24, 26, 46 returns to self-monitoring mode (at 106 in FIG. 5). In another example, the action taken by the central server 24 includes modifying a sequence of operations 66, where the sequence of operations 66 includes the at least one operation, by at least one of modifying at least one of the prerequisite condition and the subsequent operation, and modifying the position of the at least one operation in the sequence 66.

The method can further include, at 102 in FIG. 5, the central server 28 assigning the member 16, 24, 26, 46 to a group 50 such that the member 16, 24, 26, 46 is associated with the group 50 as a group member, where the group 50 is comprised of a plurality of group members including the member 16, 24, 26, 46, and where the group 50 is defined by at least one of the member ID, the member location, the member function, and the current operating condition of the member 16, 24, 26, 46. Groups 50 can include one or more groups G1, G2, G3, G4 . . . Gn, as shown in FIG. 4. In the example shown, groups G1, G3, Gn are grouped by member location. For example, group 50, G1 includes all members of a station 22, S1, group 50, G3 includes all members of a facility 30, F1, and group 50, Gn includes the facilities F1, F2 . . . F5 and the members collectively included therein, such that group 50, Gn comprises the entire population of a complex 48,P1 including all the of the facilities F1, F2 . . . F5. The group members are in communication with each other and with the central server 28 via the network 10, such that group 50 learning can occur within the group 50 through the exchange of data and information via the network 10. Group 50 learning can occur, for example, by the central server 28 generating a group heartbeat 54 using timestamped data collected from the plurality of group members, where the group heartbeat 54 can be used, for example, to determine the acceptable condition of the current operating condition for the group 50, and/or to establish a baseline heartbeat 54 for the operating condition. The heartbeat 54 can be generated and/or displayed as described in U.S. Pat. No. 8,880,442 B2 issued Nov. 4, 2014. In one example, the alert signal transmitted to the central server 28 by the member 16, 24, 26, 46 is also broadcast to each other member 16, 24, 26, 46 of the group 50 which with the member 16, 24, 26, 46 is associated, such that each member 16, 24, 26, 46 of the group 50 is made aware of the condition of the member 16, 24, 26, 46.

Referring again to FIG. 8, in one example, at least one member 16, 24, 26, 46 is configured as a mobile object 46, such as a parts carrier, a hi-lo truck, a person such as an operator, etc., such that the mobile object 46 is moveable within the facility 30 during performance of the process. The mobile object 46 includes an identifier 44, where the identifier 44 is configured to wirelessly connect the at least one mobile object 46 to the network 10, and to output the member ID, the member location, and the current operating condition of the mobile object 46 to the central server 28. As such, the mobile object 46 becomes digitized in the central server 28, such that the movements and actions of the mobile object 46 can be defined within the sequence of operations 66, tasks and actions maintained by the content server 28, and the movements and actions of the mobile object 46 can be monitored and tracked by the central server 28 using the digitized input received from the mobile object 46. In one example, the mobile object 46 is a person and the identifier 44 is a wearable wireless device. In another example, the mobile object 46 includes an object tracker 42 as described in PCT application PCT/US2019/014930 filed Jan. 24, 2019, to which priority is claimed, and which is incorporated by reference herein in its entirety.

Again referring to FIGS. 6, 7 and 8, in one example, the method can further include providing an object tracker 42 in communication with the network 10, where the object tracker 42 is configured to receive an identifier signal from the identifier 44, receiving the identifier signal, via the object tracker 42, and determining, via the object tracker 42 and using the identifier signal, the member ID, the member location, and the current operating condition of the mobile object 46. As shown in the figures, each member 16, 24, 26, 46 defines a safety volume 72 characterized by a volume state, where the volume state of the safety volume 72 of the member 16, 24, 26, 46, at a monitoring time, is determined by at least one of the member function, the member location at the monitoring time, and the current operating condition of the member 16, 24, 26, 46 at the monitoring time, where at the monitoring time, the volume state of the member 16, 24, 26, 46 is determined by a distance between the safety volume 72 of the member 16, 24, 26, 46 and a safety volume 72 of another member 16, 24, 26, 46. Further, at the monitoring time, the volume state is determined to be in one of an acceptable state 72, an alert state 74, and an action state 76. The volume state of the member 16, 24, 26, 46 is determined to be in the action state 78 when the safety volume 72 of the member 16, 24, 26, 46 overlaps the safety volume 72 of the other member 16, 24, 26, 46. The central server 28 is configured to issue, at the monitoring time, via the central server 28, an alert to the member 16, 24, 26, 46 when the volume state is determined to be the alert state. Further, when the volume state of the member 16, 24, 26, 46 is determined to be in the action state 78, the central sever 28 initiates an action including at least one of moving, at the monitoring time, via the central server 28, at least one of the member 16, 24, 26, 46 and the another member 16, 24, 26, 46 away from the other of the member 16, 24, 26, 46 and the another member 16, 24, 26, 46, and ceasing, at the monitoring time, via the central server 28, the operation of at least one of the member 16, 24, 26, 46 and the another member 16, 24, 26, 46.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for distributed automation control, the method comprising:
   providing a network;
   wherein the network comprises an ethernet over power (EoP) cable;
   providing a central server in communication with the network;
   connecting a plurality of members to the central server via the network such that each member is in communication with the central server;

wherein connecting each member of the plurality of members to the central server comprises:
  connecting the member to the network;
  broadcasting to the central server, from the member via the network, a member identification (ID) of the member, a location of the member provided as a member location, and a function performable by the member provided as a member function, and a current operating condition of the member;
wherein the central server includes a memory and a processor and is configured to:
  store a plurality of operations to a database;
  assign, via the network, at least one operation of the plurality of operations to the member;
the method further comprising:
  assigning, via the network, the at least one operation to the member;
wherein at least one member of the plurality of members is a device;
wherein the device comprises a microcontroller in communication with the central server via the EoP cable; and
wherein the microcontroller includes a processor and a memory configured to:
  control the device to perform the at least one operation assigned to the device;
wherein the member is configured to:
  monitor the current operating condition of the member;
  compare the current operating condition of the member to an acceptable condition defined for the current operating condition;
  monitor a performance of the at least one operation assigned to the member;
  compare the performance of the at least one operation to an operation specification defined for the at least one operation;
  transmit an alert signal to the central server when at least one of:
    the current operating condition of the member is not the acceptable condition; and
    the performance of the at least one operation is noncompliant with the operation specification;
the method further comprising:
  monitoring, via the member, the current operating condition of the member;
  monitoring, via the member, the performance of the at least one operation by the member;
  comparing the performance of the at least one operation to the operation specification;
  transmitting, via the member, the alert signal to the central server when at least one of:
    the current operating condition of the member is not the acceptable condition; and
    the performance of the at least one operation is noncompliant with the operation specification.

2. The method of claim 1, further comprising:
receiving, via the central server, the alert signal from the member; and
identifying, via the central server, an action in response to the alert signal;
assigning, via the central server, the action to at least one member of the plurality of members, for performance of the action by the at least one member.

3. The method of claim 2, wherein the action comprises at least one of:
ceasing performing of the at least one operation by the member;
ceasing operation of the member;
reassigning the at least one operation to another member of the plurality of members, for performance of the at least one operation by the another member.

4. The method of claim 2, wherein the action comprises:
modifying a current operating condition of another member of the plurality of members;
wherein modifying the current operating condition of the another member causes a change in the current operating condition of the member.

5. The method of claim 4, wherein:
the plurality of members includes at least one facility component; and
the another member is the at least one facility component.

6. The method of claim 2, the method further comprising:
defining, via the central server, a sequence of operations including the at least one operation in a position in the sequence;
wherein the at least one operation is associated with a prerequisite condition and a subsequent operation;
wherein the action comprises modifying the sequence of operations by at least one of:
  modifying at least one of the prerequisite condition and the subsequent operation; and
  modifying the position of the at least one operation in the sequence.

7. The method of claim 1, further comprising:
assigning, via the central server, the member to a group such that the member is associated with the group as a group member;
wherein the group:
  is comprised of a plurality of group members including the member;
  is defined by at least one of the member ID, the member location, the member function, and the current operating condition of the member; and
  the group members are in communication with each other and with the central server via the network; and
broadcasting, via one of the central server and the member, the alert signal to each other member of the group.

8. The method of claim 7, further comprising:
transmitting, via each respective group member of the plurality of group members, the current operating condition of the respective group member;
receiving, via the central server, the current operating condition of the respective group member;
time stamping, via the central server, the current operating condition of the respective group member with a time stamp; and
storing to the database, via the central server, the current operating condition of the respective group member and the time stamp associated with the current operating condition as a time stamp-current operating condition pair;
generating a group heartbeat, via the central server, for the current operating condition, using the current operating condition and associated time stamp received from the plurality of group members.

9. The method of claim 8, further comprising:
determining, via the central server, the acceptable condition of the current operating condition for the group, using the group heartbeat.

10. The method of claim 1, wherein the plurality of members includes at least one facility component.

11. The method of claim 1, wherein the plurality of members includes at least one mobile object;

wherein the at least one mobile object includes an identifier;

the method further comprising:
wirelessly connecting the at least one mobile object to the network, via the identifier;
broadcasting, via the identifier, the member ID, the member location, and the current operating condition of the at least one mobile object, to the central server.

12. The method of claim 11, wherein the at least one mobile object is one of a person and a vehicle; and
wherein the identifier includes a wireless communications module.

13. The method of claim 12, wherein the at least one mobile object is the vehicle; and
wherein the identifier is an object tracker.

14. The method of claim 11, further comprising:
providing an object tracker in communication with the network;
wherein the object tracker is configured to receive an identifier signal from the identifier;
receiving the identifier signal, via the object tracker;
determining, via the object tracker and using the identifier signal, the member ID, the member location, and the current operating condition of the mobile object.

15. The method of claim 11, wherein each member defines a safety volume characterized by a volume state;
wherein the volume state of the safety volume of the member, at a monitoring time, is determined by at least one of the member function, the member location at the monitoring time, and the current operating condition of the member at the monitoring time;
wherein at the monitoring time, the volume state of the member is determined by a distance between the safety volume of the member and a safety volume of another member;
wherein at the monitoring time, the volume state is determined to be in one of an acceptable state, an alert state, and an action state;
the method further comprising:
determining, at the monitoring time, via the central server, the volume state of the member.

16. The method of claim 15, wherein the volume state of the member is determined to be in the action state when the safety volume of the member overlaps the safety volume of the another member.

17. The method of claim 15, further comprising:
issuing, at the monitoring time, via the central server, an alert to the member when the volume state is determined to be the alert state.

18. The method of claim 15, further comprising, when the volume state of the member is determined to be in the action state, at least one of:
moving, at the monitoring time, via the central server, at least one of the member and the another member away from the other of the member and the another member; and
ceasing, at the monitoring time, via the central server, the operation of at least one of the member and the another member.

19. The method of claim 1, further comprising:
providing a sensor in communication with the member;
wherein the sensor is configured to sense at least one of the operating condition of the member and the performance of the at least one operation assigned to the member;
sensing, via the sensor, the at least one of the operating condition of the member and the performance of the at least one operation assigned to the member;
outputting a sensor signal, via the sensor, to the member, wherein the sensor signal is defined by the at least one of the operating condition of the member and the performance of the at least one operation assigned to the member sensed by the sensor.

20. A system for distributed automation control, the system comprising:
a network comprising an ethernet over power (EoP) cable;
a central server in communication with the network;
a plurality of members connected to the central server via the network such that each member is in communication with the central server;
wherein connecting each member of the plurality of members to the central server comprises:
connecting the member to the network;
broadcasting to the central server, from the member via the network, a member identification (ID) of the member, a location of the member provided as a member location, and a function performable by the member provided as a member function, and a current operating condition of the member;
wherein the central server includes a memory and a processor and is configured to:
store a plurality of operations to a database;
assign, via the network, at least one operation of the plurality of operations to the member;
wherein at least one member of the plurality of members is a device;
wherein the device comprises a microcontroller in communication with the central server via the EoP cable; and
wherein the microcontroller includes a processor and a memory configured to:
control the device to perform the at least one operation assigned to the device;
wherein the member is configured to:
monitor the current operating condition of the member;
compare the current operating condition of the member to an acceptable condition defined for the current operating condition;
monitor a performance of the at least one operation assigned to the member;
compare the performance of the at least one operation to an operation specification defined for the at least one operation; and
transmit an alert signal to the central server when at least one of:
the current operating condition of the member is not the acceptable condition; and
the performance of the at least one operation is noncompliant with the operation specification.

* * * * *